No. 717,734. PATENTED JAN. 6, 1903.
T. E. CAMPBELL.
WRENCH.
APPLICATION FILED MAR. 27, 1902.
NO MODEL.
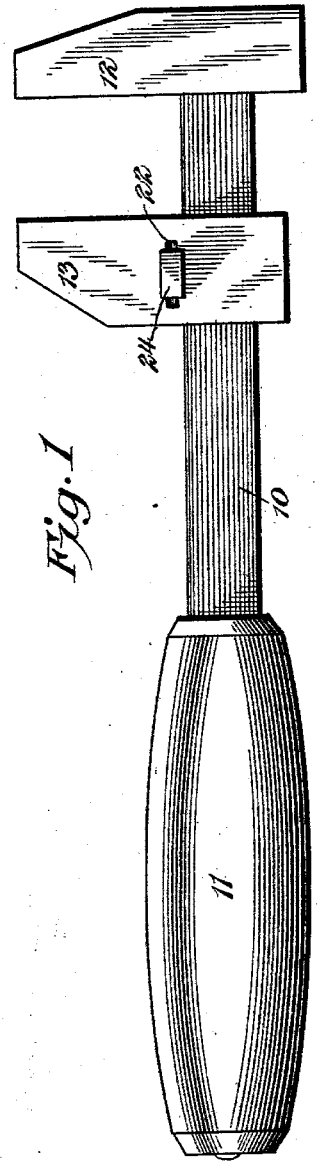
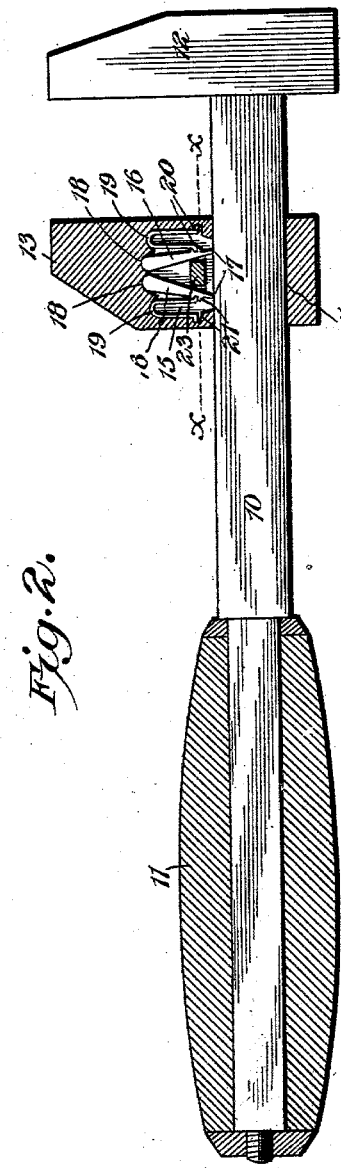
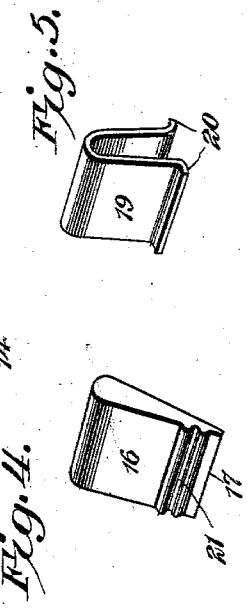
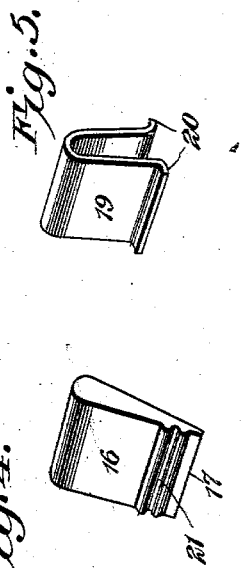
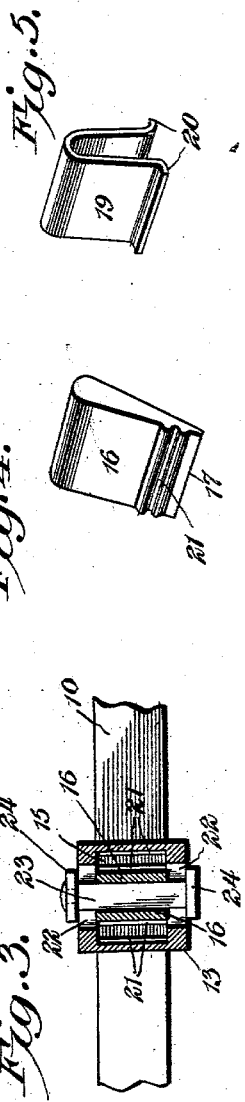
Thomas E. Campbell, Inventor,
Witnesses
Attorney

UNITED STATES PATENT OFFICE.

THOMAS E. CAMPBELL, OF MEXIA, TEXAS.

WRENCH.

SPECIFICATION forming part of Letters Patent No. 717,734, dated January 6, 1903.

Application filed March 27, 1902. Serial No. 100,237. (No model.)

*To all whom it may concern:*

Be it known that I, THOMAS E. CAMPBELL, a citizen of the United States, residing at Mexia, in the county of Limestone and State of Texas, have invented a new and useful Wrench, of which the following is a specification.

The present invention relates to wrenches, and particularly to that class in which a shank is provided having a stationary jaw and a movable jaw slidably mounted upon the shank and movable toward and from the stationary jaw.

The object of the invention is to provide novel means for locking the sliding jaw against movement on the shank, said means when in action securely holding the movable jaw against accidental displacement, though permitting of its ready releasement and free movement when it is desired to vary the distance between the jaws.

The preferred embodiment of the invention is fully illustrated in the accompanying drawings, wherein—

Figure 1 is a side elevation of the wrench. Fig. 2 is a longitudinal sectional view through the same. Fig. 3 is a detail sectional view on the line X X of Fig. 2. Fig. 4 is a perspective view of one of the locking-dogs employed, and Fig. 5 is a perspective view of one of the resistance-springs for the same.

Similar numerals of reference designate corresponding parts in all the figures of the drawings.

In carrying out the invention, as shown, the usual shank 10 is employed, having at one end a handle 11 and at the other end a jaw 12. Slidably mounted upon the shank 10, between the handle 11 and the jaw 12, is a movable jaw 13, having an opening 14 through which said shank is passed and being provided with an interior chamber 15, that is in communication with the opening 14, as clearly shown in Fig. 2. A pair of locking-dogs 16 are pivotally mounted within this chamber, said dogs being arranged in divergent relations and having their outer ends sharpened, as shown at 17, and engaging the adjacent face of the shank 10. The rear ends of these dogs are preferably rounded and seated in transverse sockets 18, formed in the rear wall of the chamber. Resistance-springs 19, located between the outer side faces of the dogs and the side faces of the chamber, urge said dogs into engagement with the shank. The springs are preferably constructed in the form shown and have outturned terminals 20, that engage in seats 21, made in the walls and in the outer face of the dogs. Transverse slots 22 are made through the walls of the chamber, and through these slots is passed an actuating device in the form of a pin 23, that is located between the locking-dogs, said pin having heads 24, as at its opposite ends, which are located on the exterior of the jaw, one of the heads being riveted in place, as clearly shown in Fig. 3. Under normal conditions the sliding jaw is held against movement by the locking-dogs, which are forced into engagement with the shank by the springs 19, and thus movement is prevented in either direction, because of the divergent arrangement of the dogs. If now it is desired to slide the moving jaw toward the stationary jaw, it is only necessary to grasp the heads of the pin between the thumb and finger and move these upon the movable jaw, whereupon said pin will be moved into engagement with the nearest dog and disengage the same from the shank against the resistance of the spring. Upon a further movement the entire jaw will of course be moved, the other dog sliding over the shank. To move the jaw in the opposite direction, it is of course only necessary to reverse the movement of the pin. By this arrangement it will be seen that an exceedingly inexpensive quick-action wrench is provided which will securely hold the slidable jaw against movement in either direction, but may be readily unlocked and moved freely without interference when desired.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Attention is called to the fact that the holding-dogs engage the shank at two separated points, and in this respect differs widely from wrenches of this type.

Having thus described my invention, what

I claim as new, and desire to secure by Letters Patent, is—

1. In a wrench, the combination with a shank having a stationary jaw, of a movable jaw slidably mounted upon the shank, oppositely-inclined holding-dogs pivoted upon one side of the movable jaw and engaging the same side of the shank, to hold said shank against movement in either direction and means for urging the dogs into such engagement.

2. In a wrench, the combination with a shank having a stationary jaw, of a movable jaw slidably mounted upon one side of the shank, oppositely-inclined holding-dogs pivoted upon the movable jaw and engaging the same side of the shank, and a spring bearing against each dog to urge them toward each other and into engagement with the shank.

3. In a wrench, the combination with a shank having a stationary jaw, of a movable jaw slidably mounted upon the shank, oppositely-inclined holding-dogs pivoted upon the movable jaw and engaging the shank, and a common actuating device coacting with both dogs to move them out of engagement with the shank.

4. In a wrench, the combination with a shank having a stationary jaw, of a movable jaw slidably mounted upon the shank and having a chamber, of a pair of divergently-disposed dogs pivoted within the chamber and engaging the shank, an actuating-pin for the dogs slidably mounted upon the movable jaw and extending across the chamber thereof between said dogs, and springs arranged within the chamber and bearing against the dogs to hold them in engagement with the shank.

5. In a wrench, the combination with a shank having a smooth face, of a movable jaw slidably mounted upon the shank, independently-movable holding devices mounted upon the sliding jaw and engaging the smooth face to hold said jaw against movement, and means for urging the holding devices into said engagement.

6. In a wrench, the combination with a shank, of a movable jaw slidably mounted upon the shank, independently-movable holding devices mounted upon the sliding jaw and engaging the shank at separated points, and an actuating device movably mounted between the holding devices and alternately movable into engagement with the same to disengage them from the shank.

In testimony that I claim the foregoing as my own I have hereto affixed my signature in the presence of two witnesses.

THOMAS E. CAMPBELL.

Witnesses:
JOHN KEYS,
IKE W. CAMPBELL.